United States Patent
Ishikawa et al.

(10) Patent No.: US 11,885,431 B2
(45) Date of Patent: Jan. 30, 2024

(54) VALVE MODULE, VALVE DEVICE, VALVE SYSTEM

(71) Applicant: TRINITY INDUSTRIAL CORPORATION, Aichi (JP)

(72) Inventors: Katsuhiro Ishikawa, Aichi (JP); Naohiro Osawa, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 0 days.

(21) Appl. No.: 17/637,835

(22) PCT Filed: Sep. 17, 2019

(86) PCT No.: PCT/JP2019/036285
§ 371 (c)(1),
(2) Date: Feb. 24, 2022

(87) PCT Pub. No.: WO2021/053708
PCT Pub. Date: Mar. 25, 2021

(65) Prior Publication Data
US 2022/0275879 A1    Sep. 1, 2022

(51) Int. Cl.
*F16K 31/08*    (2006.01)
*F16K 31/122*    (2006.01)

(52) U.S. Cl.
CPC ........ *F16K 31/084* (2013.01); *F16K 31/1221* (2013.01)

(58) Field of Classification Search
CPC ....... F16K 31/84; F16K 31/1221; F16K 31/08
See application file for complete search history.

(56) References Cited

U.S. PATENT DOCUMENTS 6,908,048 B2 *   6/2005   Di Gioia ............... B05B 7/1404
                                                              239/304
9,671,034 B2 *   6/2017   Graichen ............ F16K 31/1221
(Continued)

FOREIGN PATENT DOCUMENTS

JP    01-220784    9/1989
JP    4-145276    5/1992
(Continued)

*Primary Examiner* — Umashankar Venkatesan
(74) *Attorney, Agent, or Firm* — Clark & Brody LP

(57) ABSTRACT

This invention provides a valve-module that is operative with relatively low-pressure pilot-air despite its small size and has excellent durability with less performance-variations than among other similar products. The valve-module of the present invention includes a pilot-port and a biasing-means for biasing the piston-portion in the opposite direction, and controls the opening and closing of the valve by supplying and discharging pilot-air. The first-permanent magnet is held by the first magnet-holder of the valve-rod, and the second-permanent magnet is held by the second magnet-holder of the piston housing. A magnetic-attraction force acts between both permanent magnets and drives the piston in the first direction and increases with the mutual approach of both magnets. Due to the presence of the thin-walled first-and-second collision-avoidance portions, an arrangement-relationship is set between the two permanent magnets such that the end-faces do not directly collide with each other, even when they are closest to each other.

12 Claims, 10 Drawing Sheets

(56) References Cited

U.S. PATENT DOCUMENTS

| | | | | |
|---|---|---|---|---|
| 10,035,161 B2* | 7/2018 | Robert | ................ | B05B 12/149 |
| 10,085,825 B2* | 10/2018 | Benfield | ............. | F16K 31/1221 |
| 10,434,533 B2* | 10/2019 | Robert | ................ | B25B 13/065 |
| 10,852,753 B2* | 12/2020 | Jung | ................ | F16K 31/1221 |
| 11,041,575 B2* | 6/2021 | Ishikawa | ............... | F16K 31/084 |
| 11,435,008 B2* | 9/2022 | Butland | ................ | F16K 15/08 |
| 11,496,036 B2* | 11/2022 | Kawada | ................ | H02K 7/116 |
| 2005/0224513 A1* | 10/2005 | Strong | ................ | B05B 7/066 |
| | | | | 222/1 |
| 2006/0124880 A1* | 6/2006 | King | ...................... | F16K 31/08 |
| | | | | 251/65 |
| 2012/0042960 A1 | 2/2012 | Muraki | | |
| 2012/0313019 A1* | 12/2012 | Neudeck | ............. | B05C 5/0225 |
| | | | | 251/65 |

FOREIGN PATENT DOCUMENTS

| | | |
|---|---|---|
| JP | 09-196201 | 7/1997 |
| JP | 11-257307 | 9/1999 |
| JP | 2005-265107 | 9/2005 |
| JP | 2011-117519 | 6/2011 |
| JP | 2012-112449 | 6/2012 |
| JP | 2012-522942 | 9/2012 |
| JP | 5511339 | 4/2014 |
| JP | 2016-503155 | 2/2016 |
| JP | 2017-002939 | 1/2017 |
| JP | 2017-115944 | 6/2017 |
| WO | 2010/113767 | 10/2010 |

* cited by examiner

VALVE MODULE, VALVE DEVICE, VALVE SYSTEM

TECHNICAL FIELD

This invention relates to a valve module or the like, especially to a valve module or the like as a color-change valve to supply each selected color of coating that is being transported from a color-coating source to a coating-machine or the like.

TECHNICAL BACKGROUND

Demand from users for vehicle-color variation has recently diversified, and it is necessary now to coat many different colors onto the same model of car. Especially, recent car bodies that need to be coated with different colors are mixed and carried onto a car-coating line. Thus, it is needed to coat such a car body by changing the color coating in accordance with the body type.

As shown in FIG. 12, the color-change device 101 is used, for example, to change the color coating. Conventionally, the general type of color-change device 101 has a structure of which multiple color-change valves 104 and a cleaning-liquid valve 105 and a cleaning-air valve 106 or the like are provided on a manifold block 103, therein a color-coating passage 102 is formed. These multiple color-change valves 104 are connected respectively to each color-coating source P1 to P4. The cleaning-liquid valve 105 is connected to the cleaning-liquid source 107, and the cleaning-air valve 106 is connected to the pressed-air source 108. Using such a color-change device 101 allows the color-change device 101 to select any color of coating from among many colors of coating, which makes it possible to supply such selected coating to the coating machine 109, thus aiding in coating the car body.

FIG. 13 shows an example of the conventional type of valve device wherein the color-change valve 104 is used for this type of color-change device 101. This color-change valve 104 is a pilot-type 2-port valve that has the driving means of the piston cylinder made of the valve-driving part 112 located at the upper part of the drawing, and the valve-main body 113 is located at the lower part of the drawing.

The piston housing 121 making the valve-driving part 112 has a piston housing chamber 122 inside and a rod-insertion hole 123 passing through the piston-housing chamber 122 at the bottom. The valve housing 131 is provided at the bottom-end face of the piston housing 121. The input port 132 is formed on the side of the valve housing 131, and the output port 133 is formed at the bottom face. These ports 132, 133 are communicated with the passage 134 provided within the valve housing 131. The valve seat 135 is formed within the opening of the output port 133. A shaft seal 138, including the packing 136, 137 or the like, is arranged in the valve housing 131.

This color-change valve 104 has a valve rod 141 as a mobile body 141 having a rod 142 and a piston part 143 and a valve part 144. The piston part 143 is secured on the base-end of the rod 142 and is slidably stored within the piston-housing chamber 122. The tip of the rod 142 protrudes out of the piston-housing chamber 122 through the rod-insertion hole 123 and the shaft seal 138. Then, such protrusion reaches the vicinity of the valve seat 135 of the valve housing 131. The valve 144 is integrally formed at the tip of the rod 142 and can be contacted to and separated from the valve seat 135.

The piston-housing chamber 122 within the piston housing 121 is divided by the piston 143 into the first chamber 151 and second chamber 152. The pilot port 153 is formed in the first chamber 151 of the piston housing 121, which drives the piston 143 upward to supply the pilot air. A biasing means 154 is stored in the second chamber 152 of the piston housing 121, which biases the piston 143 downward all the time. Such a mechanism of the color-change valve 104 makes it possible to drive the valve rod 141 vertically by the supply and discharge of the pilot air, with the valve 144 being contacted or separated from the valve seat 135, subsequently controlling the opening and closing of the valve.

Besides this type of valve device, the valve as shown in Patent Document 1, for example, is conventionally suggested.

PRIOR ARTS

Patent Documents

Patent Document 1: Japanese Patent No. 5511339
Patent Document 2: Unexamined Japanese Patent Application No. 2017-2939

SUMMARY OF THE INVENTION

Problems to be Solved by the Invention

The above conventional valve device is installed into a driving part such as the arm of the coating machine or the like. Therefore, such a valve device is required to be as small as possible. However, if the valve device is downsized, the diameter of the piston should be smaller, thus decreasing the pressurized area of the piston. To activate the piston under a similar power, as usual, it is necessary to increase the pressure of the pilot air (e.g. 0.4 MPa should be increased to 0.8 MPa). Therefore, the compressed pressure to supply the air should be increased.

Under such circumstance, a valve device is conventionally suggested such that the piston-drive force based on the pilot air should be supported by magnetic force (e.g. see Patent Document 2). However, the conventional device has a complicated structure and there is also the concern about damage, because the magnets stored within the housing directly make contact with each other, thus making the housing less durable.

Therefore, the inventors of the present invention, while assisting the piston-driving force based on the pilot air, by using the magnetic-attraction force of the permanent magnet, are considering setting an arrangement relationship between the permanent magnet on the valve-rod side and the permanent magnet on the housing side, as that the two magnets are facing each other across the void space even when they come across the closest point. Specifically, it is considered in the valve device of FIG. 13 to arrange permanent magnets at the positions as shown by, for example, 161 and 162, respectively.

However, to obtain the desired magnetic-attraction force in this valve device, a permanent magnet as large as possible should be used, but since it is a small valve device, there was the problem such that the size of the permanent magnet that can be used is limited. Further, while it is necessary to make the clearance to be set between the permanent magnets extremely narrow (for example, 1.0 mm or less), so as to obtain the desired magnetic-attraction force, it is actually very difficult to secure such a clearance. Further, it is conceivable that the piston shakes and slightly tilts during operation, and since the clearance is extremely narrow, there is the problem that the risk of direct contact between the permanent magnets increases. Furthermore, a means for securely fixing each permanent magnet was also required. In addition, individual permanent magnets have dimensional variations, and it is conceivable that the performance will vary depending on each valve-device product. Therefore, it has been required to eliminate the occurrence of performance variation of each product.

The present invention has been made in view of the above problems, and the object thereof is to provide valve modules, valve devices and valve systems that can be operated with a relatively low pressure of pilot air despite the small size of the present invention, and that such invention has excellent durability and less variation in performance among the valve products.

Means for Solving the Problems

To solve the above problems, the first aspect of this invention refers to a valve-module comprising: a piston-housing body having a piston-housing chamber; and a valve-rod of which a part thereof is inserted into the piston housing body, and a piston is provided in the region located inside the piston-housing chamber, and a valve is formed in the region located outside the piston-housing chamber; therein, the valve-rod is driven in the first direction by the air pressure of the pilot-air acting upon the piston, and is driven in the second direction opposite the first direction by the biasing-force of the biasing-means; then the valve makes contact with and separates from the valve-seat by supplying and discharging the pilot-air, thus controlling the opening and closing of the valve, characterized in comprising; a first-magnet holder provided at the outer periphery of the piston; a second-magnet holder provided at the position facing the first-magnet holder on the piston-housing body side; a first-permanent magnet held by the first-magnet holder in the state in which the end-face makes contact with the thin-walled first-collision-avoidance portion formed at the position closest to the second-magnet holder; and a second-permanent magnet held by the second-magnet holder in the state in which the end-face makes contact with the thin-walled second-collision-avoidance portion formed at the position closest to the first-collision-avoidance portion of the first-magnet holder; wherein, the magnetic-attraction force acts between both permanent magnets, and drives the piston in the first direction, and increases with the mutual approach of both magnets; in addition, an arrangement relationship is set between both permanent magnets such that the end-faces do not directly collide with each other, even when they are closest to each other.

The second aspect of this invention refers to a valve device comprising; a housing-block having a piston-housing chamber and a valve-seat inside; and a valve-rod of which a part thereof is inserted into the piston-housing body, and a piston is provided in the region located inside the piston-housing chamber, and a valve is formed in the region located outside the piston-housing chamber; therein, the valve-rod is driven in the first direction by the air pressure of the pilot-air acting upon the piston, and is driven in the second direction opposite the first direction by the biasing-force of the biasing-means; then the valve makes contact with and separates from the valve-seat by supplying and discharging the pilot-air, between the opening and closing of the valve, characterized in comprising: a first-magnet holder provided at the outer periphery of the piston; a second-magnet holder provided at the position facing the first-magnet holder on the housing-block side; a first-permanent magnet held by the first-magnet holder in the state in which the end-face makes contact with the thin-walled first-collision-avoidance portion formed at the position closest to the second-magnet holder; and a second-permanent magnet held by the second-magnet holder in the state in which the end-face makes contact with the thin-walled second-collision-avoidance portion formed at the position closest to the first-collision-avoidance portion of the first-magnet holder; wherein, the magnetic-attraction force acts between both permanent magnets, and drives the piston in the first direction, and increases with the mutual approach of both magnets; in addition, an arrangement relationship is set between both permanent magnets such that the end-faces do not directly collide with each other, even when they are closest to each other.

Therefore, according to the first and second aspects of this invention, a magnetic-attraction force, which drives the piston in the first direction and increases with the mutual approach of both permanent magnets, acts between the two permanent magnets. As such, when the pilot-air is supplied, the valve-rod is driven in the first direction by the action of the magnetic-attraction force and by the pressure of the pilot air. Thus, even if the pressure-receiving area of the piston is small, the opening and closing of the valve can be controlled by using pilot-air of relatively low pressure. Also, since the arrangement relationship of the two permanent magnets is set such that they face each other with a clearance between them, even when they are closest to each other, contact of the two permanent magnets is avoided when the valve-rod is being driven. Therefore, damage due to direct contact of the permanent magnets is less likely to occur, thus improving durability. Also, when the two permanent magnets approach each other and stick together, a large separating force is required, but since contact of the two permanent magnets is avoided, the separating force can be reduced. Further, since the first and second permanent magnets are held in the first and second magnet holder respectively, and the end-faces of both permanent magnets are arranged in contact with the first and second collision-avoidance portions, both permanent magnets are securely fixed. Moreover, since both the first and second collision-avoidance portions are thin, it is possible to set the clearance between the two permanent magnets extremely narrowly, while direct collision between the two permanent magnets is avoided. Furthermore, even if the individual permanent magnets have dimensional variations, it is possible to make the magnitudes of the magnetic-attraction force uniform, for example, by defining the size of the clearance according to the thickness of the first and second collision-avoidance portions, thus making it possible to minimize the performance variation of each product.

In the first and second aspect above, it is preferable that the dimension of the housing space of the first-magnet holder, in the axial direction of the valve-rod, is greater than the dimension in the axial direction of the first-permanent magnet, and that the dimension of the housing space of the second magnet holder, in the axial direction of the valve-rod, is greater than the dimension in the axial direction of the second-permanent magnet.

According to the above configuration, the first and second permanent magnets can be housed in the first and second magnet holder with a slight clearance space (spatial allowance) in the axial direction of the valve-rod, respectively. Therefore, even if the permanent magnets have individually dimensional variations, they can be properly housed in the first and second magnet holders, so that cracks, chips or the like of the permanent magnets can be prevented. Since the magnetic attraction force always acts between the first and second permanent magnets, thus attracting each other, even if they are housed with a clearance space, such a fixed state does not deteriorate.

In the first and second aspect of this invention, it is preferable that the first collision-avoidance portion makes contact with the end-face of the first permanent magnet in the state in which at least a part of the end-face of the first permanent magnet is exposed to the outside of the first-magnet holder and that the second collision-avoidance portion makes contact with the end-face of the second permanent magnet in the state in which at least a part of the end-face of the second permanent magnet is exposed to the outside of the second-magnet holder.

According to the above configuration, when at least a part of the end-face of both the first and second permanent magnets is exposed to the outside of the first and second magnet holders, the magnetic field lines of the first and second permanent magnets are more likely to be interacted with each other, compared with the non-exposed case, thus making it possible to obtain a relatively great magnetic attraction.

Regarding the first and second aspects of this invention, the total thickness of the first collision-avoidance portion and the second collision-avoidance portion is preferably 1.0 mm or less.

Therefore, according to the above configuration, the size of the clearance can be defined as an extremely small value of 1.0 mm or less depending on the thickness of the first and second collision-avoidance portions, thus making it possible reliably to increase the magnetic-attraction force and to make uniform the sizes.

Regarding the first and second aspects of this invention, it is preferable that the first permanent magnet and the second permanent magnet are an annular permanent magnet of the same-diameter and are magnetized in the thickness direction.

Therefore, according to the above configuration, when the first and second permanent magnets of such a shape are used, a relatively great magnetic-attraction force can be made to act upon each other within a small-valve module.

In this case, it is preferable that either the first permanent magnet or the second permanent magnet is arranged in multiple stages in the thickness direction by using a plurality of magnets.

Therefore, according to the above configuration, a greater magnetic-attraction force can be obtained as compared with the case in which the first and second permanent magnets are used one by one.

Further, it is preferable that the number of second permanent magnets is greater than the number of first permanent magnets.

Therefore, according to the above configuration, unlike the case in which the number of first permanent magnets is greater than the number of second permanent magnets, the magnetic-attraction force can be increased without causing an increase in the weight of the entire valve rod.

The third aspect of this invention refers to a valve device comprising the valve module according to the first aspect of this invention, and a housing block having a valve module-mounting portion in which the valve seat is formed therein, characterized in that the valve module is mounted on the valve-housing block in the state in which the valve body abuts the valve module-mounting portion.

The fourth aspect of this invention refers to a valve system comprising at least one valve module according to the first aspect of this invention and a manifold block having at least one valve module-mounting portion in which the valve seat is formed therein, characterized in that the valve module is mounted in the manifold block in the state in which the valve body abuts the valve module-mounting portion.

Effects of the Invention

As described in detail above, the first to 14th aspects of this invention allow for providing a valve module or a valve device that can be operated with a relatively low pressure of pilot air despite its small size and has also excellent durability with less performance variations among the products. In addition, the 15th and 16th aspects of this invention allow for providing a valve device and a valve system that can be operated with a relatively low pressure of pilot air, despite its small size, and have excellent durability and less variations in performance among the products, since both of them have the excellent valve module as mentioned above.

BRIEF DESCRIPTION OF THE DRAWINGS

FIG. 3 is the enlarged cross-sectional view of the main part of the first embodiment of this invention.

FIG. 8 is the enlarged cross-sectional view of the main part of the third embodiment.

MODES FOR CARRYING OUT THE INVENTION

First Embodiment

Figure 1:
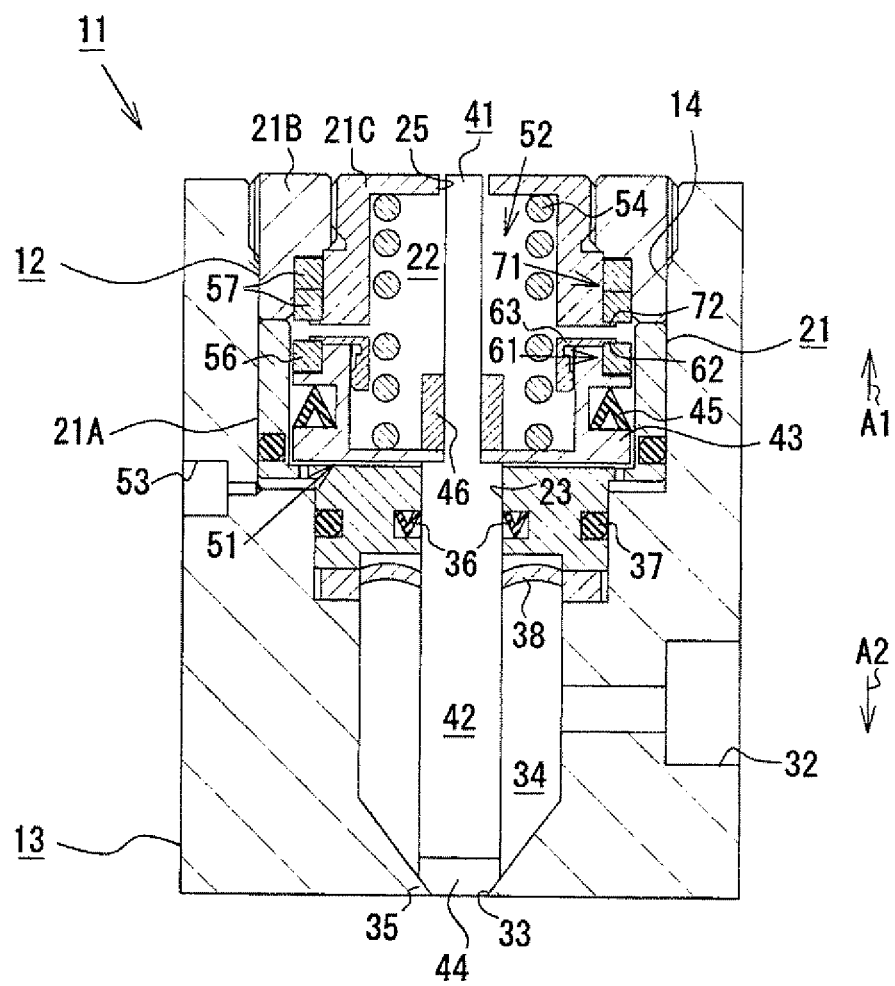
FIG. 1 is the schematic vertical-sectional view showing the valve device of the first embodiment that is configured by using the valve module that embodies the present invention.
Figure 2:
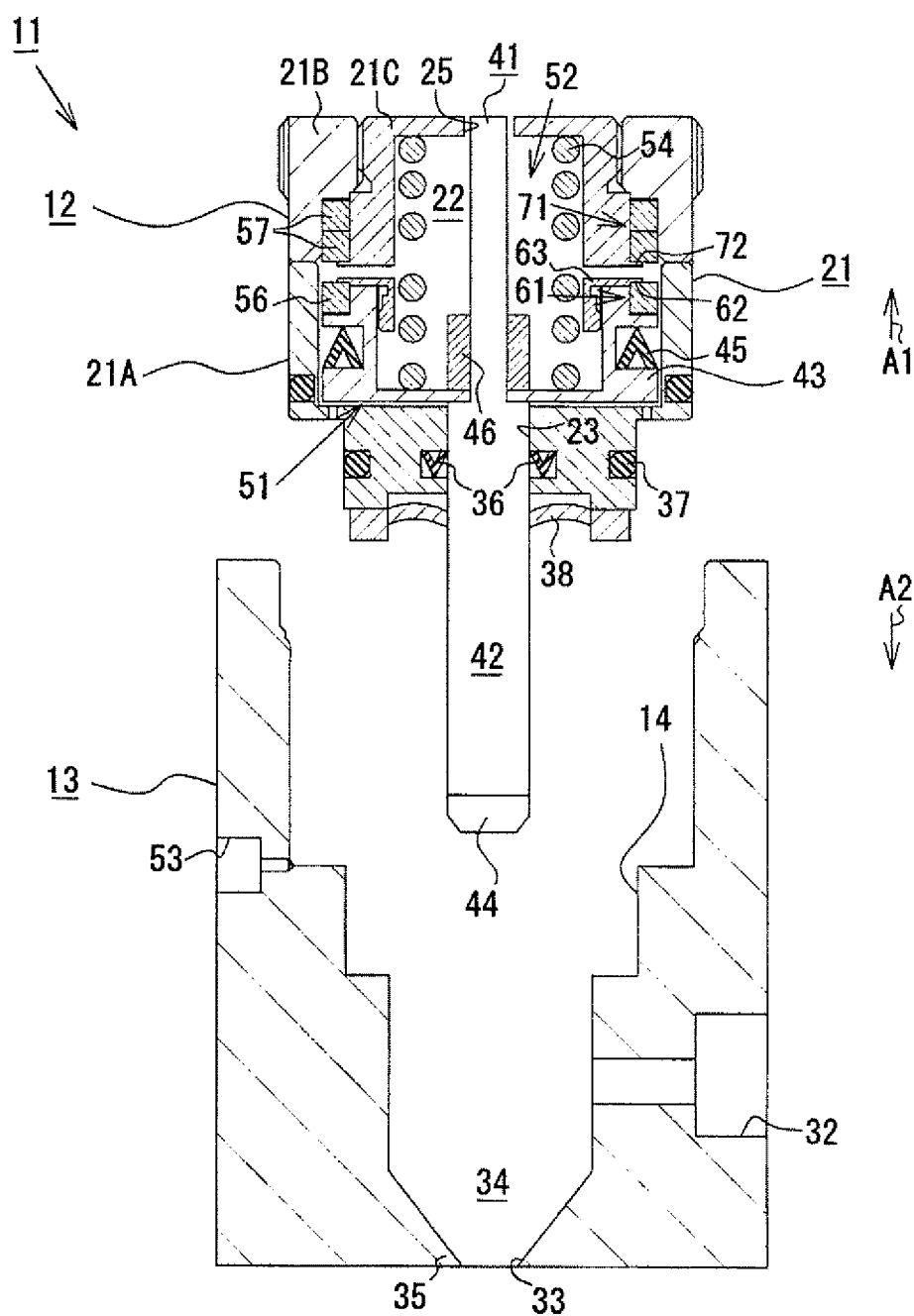
FIG. 2 is the schematic vertical-sectional view of the first embodiment showing the state in which the valve module is taken out from the housing block.
Figure 3A:
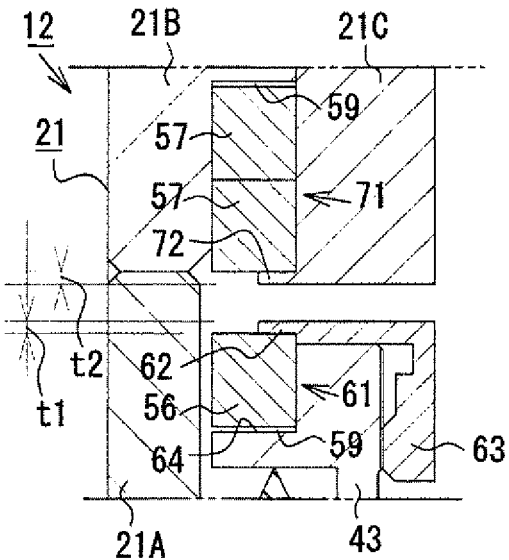
FIG. 3(a) shows the state in which the permanent magnets are most separated from each other (the valve fully-closed state)
Figure 3B:
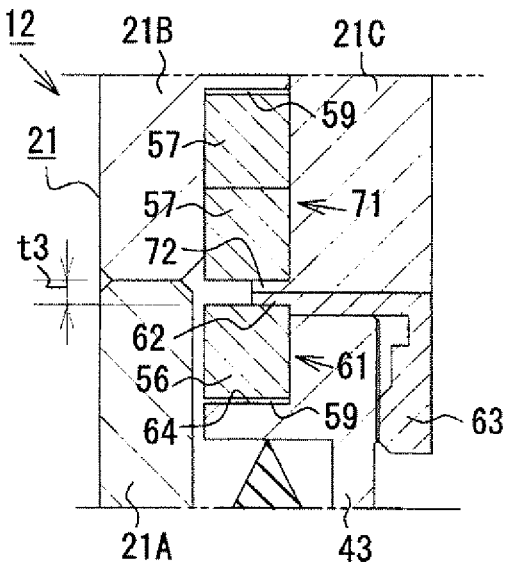
FIG. 3(b) shows the state in which the permanent magnets are closest to each other (the valve fully-open state).
Figure 4:
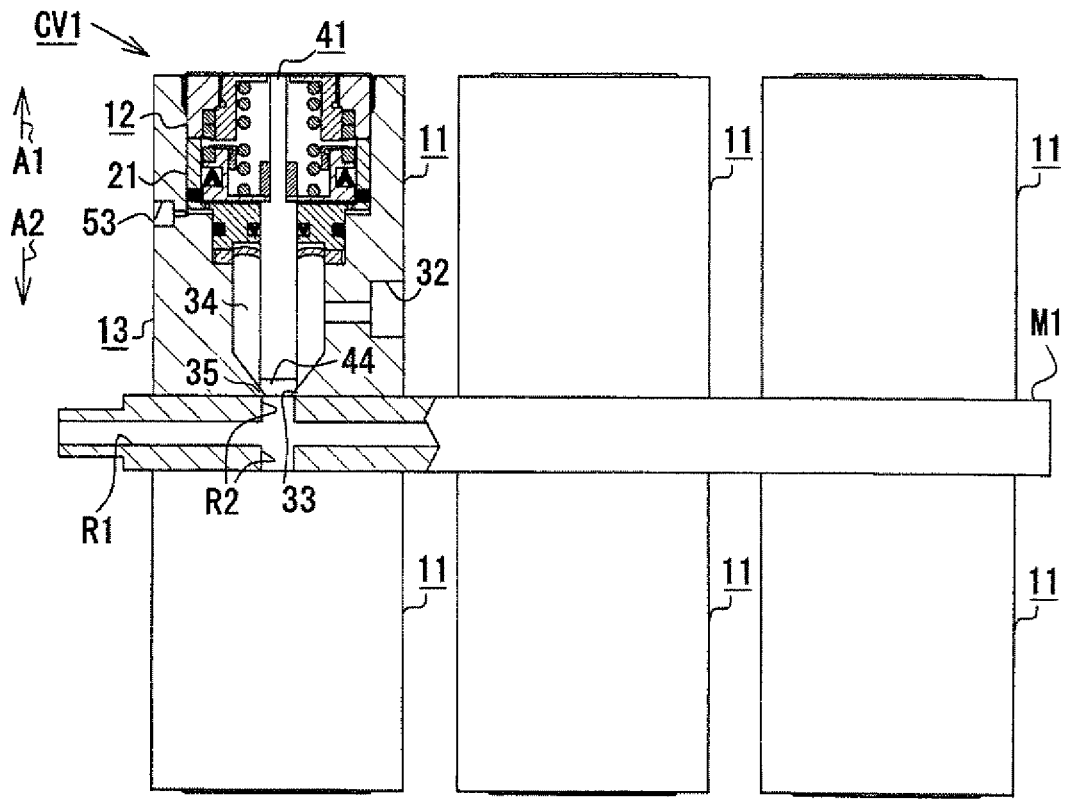
FIG. 4 is the schematic diagram for demonstrating the state at the time of using the valve device according to the first embodiment of this invention.

Hereinafter, the color change valve 11 as one embodiment embodying the valve device of the present invention will be described in detail with reference to FIGS. 1 to 4. FIG. 1 is the schematic vertical-sectional view showing the color change valve 11 of the present embodiment configured by using a valve module. FIG. 2 is the schematic vertical-sectional view showing the state in which the valve module is taken out from the housing block. FIG. 3(a) is the enlarged cross-sectional view of the main part showing the state in which the permanent magnets are most separated from each other, and FIG. 3(b) is the enlarged cross-sectional view of the main part showing the state in which the permanent magnets are closest to each other. FIG. 4 is the schematic diagram demonstrating the state in which the color-change valve 11 is used as a part of the color-change device CV1.

As shown in FIGS. 1 and 2, the color-change valve 11 of the present embodiment is a pilot-type two-port valve (two-way valve) using a piston cylinder as the drive means and is configured by the valve module 12 that is the valve-drive unit and is configured by the housing block 13 that is the valve-main body.

The housing block 13 of the present embodiment has a valve-module-mounting portion 14 that has a large opening in the central portion of the upper surface and gradually reduces in diameter toward the lower-surface side. The valve module 12 can be mounted on the valve-module-mounting portion 14. An input port 32 is formed on the side surface of the housing block 13, and an output port 33 is formed on the central portion of the lower surface. In addition, a flow path 34 through which coating flows is formed in the lower region within the housing block 13, and the input port 32 and the output port 33 are communicated with the flow path 34, respectively. A valve seat 35, having a tapered cross section, is formed inside the valve-module-mounting portion 14, which specifically is more inside the opening of the output port 33.

The valve module 12 of this present embodiment includes a piston-housing body 21. The piston-housing body 21 is composed of a plurality of members (lower member 21A, upper member 21B and lid member 21C) and has a piston housing chamber 22 inside thereof. The lower-end side of the upper member 21B is joined to the upper-end side of the lower member 21A, and the lid member 21C is screwed, crimped, bonded, or the like to the opening of the upper member 21B. The lower member 21A constituting the piston housing body 21 is composed of a small-diameter portion and a large-diameter portion on the upper-side thereof. A rod-insertion hole 23 for communicating the piston-housing chamber 22 and the external region of the piston-housing chamber 22 is formed in the center of the small-diameter portion. A seal member 36 having a substantially V-shaped cross section is arranged on the inner-wall surface of the rod insertion hole 23, and a seal member 37 having a circular-cross section is arranged on the outer-peripheral surface of the small-diameter portion. The seal member 36 prevents the pilot air from leaking from the piston-housing chamber 22 side to the external-region side (i.e. the flow path 34) of the piston-housing chamber 22 through the rod-insertion hole 23. The seal member 37 prevents the coating, the cleaning agent or the like, introduced into the flow path 34, from leaking to the piston-housing chamber 22, and also prevents the pilot air from leaking to the flow path 34. Also, a diaphragm seal 38, as a sealing member, is arranged on the lower-end surface of the small-diameter portion.

The color-change valve 11 includes a valve rod 41 as a movable body having a rod 42, a piston 43, a valve 44 and a fixing nut 46. The valve rod 41 is inserted into the central hole of the diaphragm seal 38 as a separation member, and a part thereof is slidably inserted into the rod-insertion hole 23. In regard to the rod 42 of the present embodiment, the lower half is a large diameter portion having a relatively large diameter, and the upper half is a small-diameter portion having a relatively small diameter. The bottomed cylindrical piston 43 is provided at a position within the small-diameter portion of the rod 42, that is, within the piston-housing chamber 22. The piston 43 is housed in the piston-housing chamber 22 and is slidable in the vertical direction within the piston-housing chamber 22. A groove-shaped packing-housing recess is provided on the outer-peripheral surface of the piston 43, and an annular seal packing 45 having a substantially V-shaped cross section is housed therein.

The lower-end side (tip side) of the rod 42 projects to the outer region of the piston-housing chamber 22 through the rod-insertion hole 23, and also passes through the central hole of the diaphragm seal 38 to reach the outer-region side (flow path 34) of the piston-housing chamber 22. The valve 44 having a tapered surface is integrally formed with the tip of the rod 42. The valve 44 can make contact with and separate from the valve seat 35 on the housing block 13 side as the valve rod 41 vertically moves. Incidentally, FIG. 1 shows the state in which the valve 44 is in contact with the valve seat 35.

The piston-housing chamber 22 in the piston-housing body 21 is divided into a lower-first chamber 51 and an upper-second chamber 52 by a piston 43. Of the first chamber 51, a pilot port 53 is formed such that pilot air for driving upward the piston 43 is supplied. The pilot port 53 opens on the side surface of the piston-hosing body 21 so as to communicate the first chamber 51 with the atmospheric pressure region.

The second chamber 52 in the piston-housing body 21 communicates with the atmospheric-pressure region through a rod-relief hole 25 provided in the center of the lid member 21C. The upper end of the small-diameter portion of the rod 42 is inserted into the rod-relief hole 25 in the state of non-contact at all times. A metal coil spring 54 as a biasing means is housed in the compressed state in such a second chamber 52. One end of the coil spring 54 is in contact with the upper-end surface of the piston 43, and the other end is in contact with the inner-wall surface of the lid member 21C. As a result, the coil spring 54 is in the state in which a biasing force that constantly biases the piston 43 downward is applied. The coil spring 54 is preferably made of a non-magnetic metal such as SUS316 or the like in order to make it less likely to be affected by influence of the surrounding magnetic force.

Next, a mechanism for assisting the piston driving force based on the pilot air by using a magnetic force is described.

As shown in FIGS. 1 to 3, the color-change valve 11 of the present embodiment includes a first-permanent magnet 56 and a second-permanent magnet 57 within the valve module 12. Of the present embodiment, the first-permanent magnet 56 and the second-permanent magnet 57 are both annular permanent magnets of the same diameter and are magnetized in the thickness direction. As a first-permanent magnet 56 and a second-permanent magnet 57, any conventionally known permanent magnet can be used, but as for the present embodiment, a commercially available neodymium magnet having a strong magnetic force is used. In addition, for example, a samarium-cobalt magnet, a ferrite magnet, an alnico magnet, or the like can be used.

As shown in FIG. 3, in the present embodiment, a holding structure (first magnet holder 61) for attaching the first permanent magnet 56 is provided on the piston 43, which is the moving side. That is, an annular member 63 having a thin-walled first-collision-avoidance portion (first flange 62)

forming a part of the first magnet holder 61, is attached to the upper-surface side of the piston 43 by screwing or the like. On the other hand, an annular-step portion 64 forming a part of the first magnet holder 61 is formed at the outer-peripheral position on the upper-surface side of the piston 43. And a hosing chamber is formed by the piston 43 and the annular member 63.

Similarly, as shown in FIG. 3, a holding structure (second magnet holder 71) for attaching the second permanent magnet 57 is provided at the position to face the first magnet holder 61 on the piston-housing body 21 that is the fixed side. That is, a predetermined housing chamber is formed between the inner-peripheral surface of the upper member 21B and the outer-peripheral surface of the lid member 21C, that serves as the second magnet holder 71. A second flange 72, which is the thin-walled second-collision-avoidance portion, is formed at the lower-end portion of the lid member 21C.

The first permanent magnet 56 is held by the first magnet holder 61 in the state in which the end face is in contact with the thin-walled first flange 62. The first flange 62 is formed on the first magnet holder 61 whereat a position closest to the second magnet holder 71, specifically, at the uppermost end portion of the piston 43. Further, the second permanent magnet 57 is held by the second magnet holder 71 in the state in which the end face is in contact with the thin-walled second flange 72. In addition, the second flange 72 is formed in the second magnet holder 71 whereat the position closest to the first flange 62 of the first magnet holder 61, specifically, at the lowermost end portion of the lid member 21C. That is, in the present embodiment, the first permanent magnet 56 is provided on the piston 43 that is the movable side, and the second permanent magnet 57 is provided on the piston-housing body 21 that is the fixed side.

In the present embodiment, the number of the first-permanent magnets 56 held by the first magnet holder 61 is one. On the other hand, the number of the second-permanent magnets 57 held by the second magnet holder 71 is more than that, i.e. two. These two second-permanent magnets 57 are arranged in multiple stages in the state of being laminated in the thickness direction.

The axial-directional dimension (vertical direction in FIG. 3) of the valve rod 41 within the housing chamber of the first magnet holder 61 is slightly greater than the axial-directional dimension of one piece of the first-permanent magnet 56 (for example, approximately 0.1 mm to 1.0 mm greater). Therefore, in the first magnet holder 61, the first-permanent magnet 56 is housed with a slight clearance space (spatial allowance) in the axial direction of the valve rod 41. Specifically, a slight clearance 59 is formed at the position as shown in FIG. 3.

Further, the axial-directional dimension of the valve rod 41 within the housing chamber of the second magnet holder 71 is slightly greater than the axial-directional dimension of two pieces of the second-permanent magnets 57 (for example, approximately 0.1 mm to 1.0 mm greater). Therefore, the second-permanent magnets 57 arranged in multiple stages of the second magnet holder 71 are housed with a slight clearance space (spatial allowance) in the axial direction of the valve rod 41. Specifically, a slight clearance 59 is formed at the position as shown in FIG. 3.

As shown in FIG. 3, the first flange 62 is in contact with the end face of the first permanent magnet 56 in the state in which about half of the region of the end face of the first permanent magnet 56 is exposed to the outside of the first permanent-magnet holder 61. Further, the second flange 72 is in contact with the end face of the second permanent magnet 57 in the state in which about half of the region of the end face of the second permanent magnet 57 is exposed to the outside of the second magnet holder 71. Therefore, the magnetic-field lines of the first permanent magnet 56 and of the second permanent magnet 57 easily interact with each other.

Here, the thickness t1 of the first flange 62 and the thickness t2 of the second flange 72 are both very thin and are set to, for example, approximately 0.1 mm to 0.5 mm. Therefore, the total thickness t3 of the first flange 62 and of the second flange 72 is 1.0 mm or less, and in the present embodiment, it is set to 0.3 mm to 0.4 mm. That is, here, the size of the clearance when the first permanent magnet 56 and the second permanent magnet 57 are closest to each other is defined as an extremely small value according to the thickness of the first flange 62 and the second flange 72.

Further, between the first permanent magnet 56 and the second permanent magnet 57, a magnetic force that drives the piston 43 in the upward direction A1 (first direction), as shown in FIG. 1, in other words, the arrangement relationship of such that the magnetic-attraction force acts, is set. Therefore, the first permanent magnet 56 and the second permanent magnet 57 are arranged so as to face each other with different poles facing each other. Also, the magnetic-attraction force in this case increases as the first permanent magnet 56 and the second permanent magnet 57 approach each other, and the magnetic-attraction force becomes maximum in the state as shown in FIG. 3(b), in which both permanent magnets are closest to each other.

Here, when the pilot air, as shown in FIG. 1(a), is not supplied, the inside of the first chamber 51 and of the second chamber 52 both become the atmospheric-pressure region, and due to the atmospheric pressure acting upon the first direction A1 and the second direction A2 through the piston 43, its pressing force is offset. Further, at this time, the biasing force of the coil spring 54 that ought to press the piston 43 in the second direction A2 acts upon the piston 43, and the magnetic-attraction force, which ought to press the piston 43 in the first direction A1, is acting. However, as shown in FIG. 3(a), since the first permanent magnet 56 and the second permanent magnet 57 are most separated from each other (e.g. separated by approximately 1.0 mm to 4.0 mm), the magnetic-attraction force at this time becomes the minimum value. Similarly, the first flange 62 and the second flange 72 are also separated from each other. At this time, since the magnetic-attraction force is set to be less than the biasing force of the coil spring 54, the piston 43 moves in the second direction A2. As a result, the valve rod 41 moves downward, and the valve 44 makes contact with the valve seat 35, and then the flow path 34 is closed. In other words, according to the color-change valve 11 of the present embodiment, the valve is surely closed by the biasing force of the coil spring 54, even when the pilot air is shut off.

When the pilot air is supplied, the inside of the second chamber 52 remains as the atmospheric-pressure region, while the pressurized pilot air from the pilot port 53 is introduced into the first chamber 51. As a result, the pressure of the pilot air acts upon the lower-surface side of the piston 43, and the force for pressing the piston 43 in the first direction A1 acts. The total sum of the pressing force by the pilot air and the magnetic-attraction force is previously set so as to be greater than the biasing force of the coil spring 54. Therefore, the pressing force by the pilot air and the magnetic-attraction force act simultaneously, so that the piston 43 moves in the first direction A1 against the biasing force of the coil spring 54. Then, the first flange 62 and the second flange 72 make contact with each other, and the piston 43 is held in a suspended state. As a result, the valve rod 41 moves upward, the valve 44 separates from the valve seat 35, and then the flow path 34 is opened.

Next, the operation, when the color-change valve 11 of the present embodiment is configured as described above and is used as a part of the color-change device CV1, is described. As shown in FIG. 4, the color-change valve 11 of the present embodiment is used, for example, in the state in which a plurality of color-change valves 11 are mutually connected to the manifold block M1. The main-flow path R1, which is the coating-flow path, is formed in the manifold block M1, and the sub-flow paths R2, branched from the main-flow path R1, are formed at a plurality of spots. The main-flow path R1 is connected to a coating machine (not shown). Each color-change valve 11 is attached in the state in which the housing block 13 is in contact with the manifold block M1, so that the opening of each sub-flow path R2 and the opening of the output port 33 communicate with each other. Further, the input port 32 of each color-change valve 11 is connected to a separate coating-supply source (not shown). The pilot port 53 of each color-change valve 11 is connected to an air compressor (not shown) for supplying pilot air via a fluid-control device such as a solenoid valve or the like (not shown). In the case of the present embodiment, air, having the relatively low pressure of e.g. approximately 0.4 MPa to 0.5 MPa, is supplied.

In the initial state in which pilot air is not supplied to each color-change valve 11, since the flow path 34 of each color-change valve 11 is closed, no coating is supplied to the sub-flow path R2 and to the main-flow path R1. Here, when pilot air is supplied to the specific color-change valve 11, the valve rod 41 of the color-change valve 11 is driven upward as shown in FIGS. 1 and 4. As a result, the valve 44 is in the open state and is separated from the valve seat 35, and the input port 32 and the output port 33 are communicated with each other via the flow path 34. Therefore, a predetermined coating flows from the color-change valve 11 to the manifold block M1, and such a coating is supplied to the coating machine. Also, when the supply of pilot air to the color-change valve 11 is suspended, the valve rod 41 of the color change valve 11 moves downward as shown in FIGS. 1 and 4. As a result, the valve 44 is in the closed state and is in contact with the valve seat 35, and the circuit between the input port 32 and the output port 33 is shut off. Therefore, the predetermined coating does not flow into the manifold block M1 from the color-change valve 11, and the supply of the coating to the coating machine is stopped.

Therefore, the embodiment of this invention realizes the following effects.

(1) According to the color-change valve 11 of the present embodiment, a magnetic-attraction force acts between the first permanent magnet 56 and the second permanent magnet 57, which force drives the piston 43 in the first direction A1 and increases with the mutual approach of the magnets 56 and 57 (see FIGS. 3(a) and 3(b)). Thus, when the pilot air is supplied, the valve rod 41 is driven in the first direction A1 by the action of the magnetic-attraction force together with the pressure of the pilot air. Therefore, even if the pressure-receiving area of the piston 43 is small, the opening and closing of the valve can be controlled by using the pilot air of relatively low pressure. Also, an arrangement relationship is set between the first permanent magnet 56 and the second permanent magnet 57, such that the end-faces do not directly collide with each other, even when they are closest to each other. Therefore, as a result of avoiding direct contact between the first permanent magnets 56 and the second permanent magnets 57 when the valve rod 41 is driven, durability is improved with less damage. Further, when the two permanent magnets 56 and 57 approach each other and stick together, a great separating force is required. However, since the contact between the two permanent magnets 56 and 57 is avoided, it possible to reduce the separating force. Furthermore, the first and second permanent magnets 56 and 57 are held by the first and second magnet holders 61 and 71, respectively, and the end-faces of both permanent magnets 56 and 57 are arranged in contact with the first and second flange 62 and 72, respectively. Therefore, both permanent magnets 56 and 57 are securely fixed to the first and second magnet holders 61 and 71. In addition, since the first and second flanges 62 and 72 are both thin, it is possible to set the clearance between the two permanent magnets 56 and 57 extremely narrowly while avoiding a direct collision of the two permanent magnets 56 and 57. Moreover, even if the individual permanent magnets 56 and 57 have dimensional variations, the magnitude of the magnetic-attraction force can be made uniform by, for example, defining the size of the clearance according to the thickness of the first and second flange 62 and 72. Therefore, it is possible to minimize the performance-variation of each product. As described above, the present embodiment allows for providing a color-change valve 11 that can be operated with a relatively low pressure of pilot air despite its small size and light weight, and which has excellent durability with less performance variations among the products (2) Further, in the case of the color-change valve 11, the magnetic-attraction force acting upon the piston 43 when the pilot air is not being supplied is set to be less than the biasing force of the coil spring 54. Therefore, the biasing force of the coil spring 54 moves the valve rod 41 to the position where the valve 44 abuts the valve seat 35, and the valve is held in a securely closed state. Further, the total sum of the magnetic-attraction force acting upon the piston 43 and of the pressing force by the pilot air, at the time when the pilot air is being supplied, is set to be greater than the biasing force of the coil spring 54. Therefore, the valve rod 41 moves to the position where the valve 44 is separated from the valve seat 35 by the resultant force of the magnetic-attraction force and of the pressing force by the pilot air, and the valve is surely held in the opened state. According to this embodiment, since the valve is normally of a closed type, which is closed by the biasing force of the coil spring 54 when the pilot air is not being supplied, it is possible to reduce the amount of pilot air being supplied when operating the color-change device CV1 in which most of the plurality of the color-change valves 11 are closed.

(3) In the case of this color-change valve 11, the axial-directional dimension of the valve rod 41 within the housing chamber of the first magnet holder 61 is greater than that of one piece of the first permanent magnet 56. Also, the axial-directional dimension of the valve rod 41 within the housing chamber of the second magnet holder 71 is greater than that of two pieces of the second permanent magnets 57 arranged in multiple stages. As such, the first and second permanent magnets 56 and 57 can be housed in the first and second magnet holder 61, 71 with a slight clearance space in the axial direction of the valve rod 41, respectively. Therefore, even if the permanent magnets 56, 57 have individually dimensional variations, they can be properly housed in the first and second magnet holders 61, 71, so that cracks, chips or the like of the permanent magnets can be prevented. Since the magnetic-attraction force always acts between the first and second permanent magnets 56, 57 with mutual attraction, even if they are housed with a spatial allowance, such a fixed state is not damaged.

(4) In the case of the color-change valve 11, a part of the end-face of both the first and second permanent magnets 56 and 57 is exposed to the outside of the first and second flanges 62 and 72, respectively. Therefore, as compared to the case in which the first and second permanent magnets 56 and 57 are not exposed, the magnetic-force lines of the first and second permanent magnets 56 and 57 are more likely to interact with each other, and thus a relatively great magnetic-attraction force can be obtained.

(5) In the case of the color-change valve 11, the total thickness of the first and second flanges 62 and 72 is set to 1 mm or less. As such, the size of the clearance between the first and second permanent magnets 56 and 57 at the time of their closest approach can be defined as the extremely small value of 1.0 mm or less, depending on these thicknesses. Therefore, the magnetic-attraction force can be surely increased, so that such a force can be made uniform.

(6) In the case of the color-change valve 11, the first and second permanent magnets 56 and 57 are both annular permanent magnets of the same-diameter and are magnetized in the thickness direction. Then, by using the first and second permanent magnets 56 and 57 of such a shape, a relatively large magnetic-attraction force can be mutually applied within the small-valve module 12. In addition, among the first permanent magnets 56 and the second permanent magnets 57, a plurality of second permanent magnets 57 are used and arranged in multiple stages in the thickness direction. Thus, a greater magnetic attraction can be obtained as compared to the case in which the first and second permanent magnets 56 and 57 are used one by one. In this case, furthermore, the number of the second permanent magnets 57 is more than that of the first permanent magnets 56. Therefore, unlike the case in which the number of the first permanent magnets 56 is more than that of the second permanent magnets 57, the magnetic-attraction force can be increased without causing an increase in the weight of the entire valve rod 41, which is the moving side.

Second Embodiment

Figure 5:
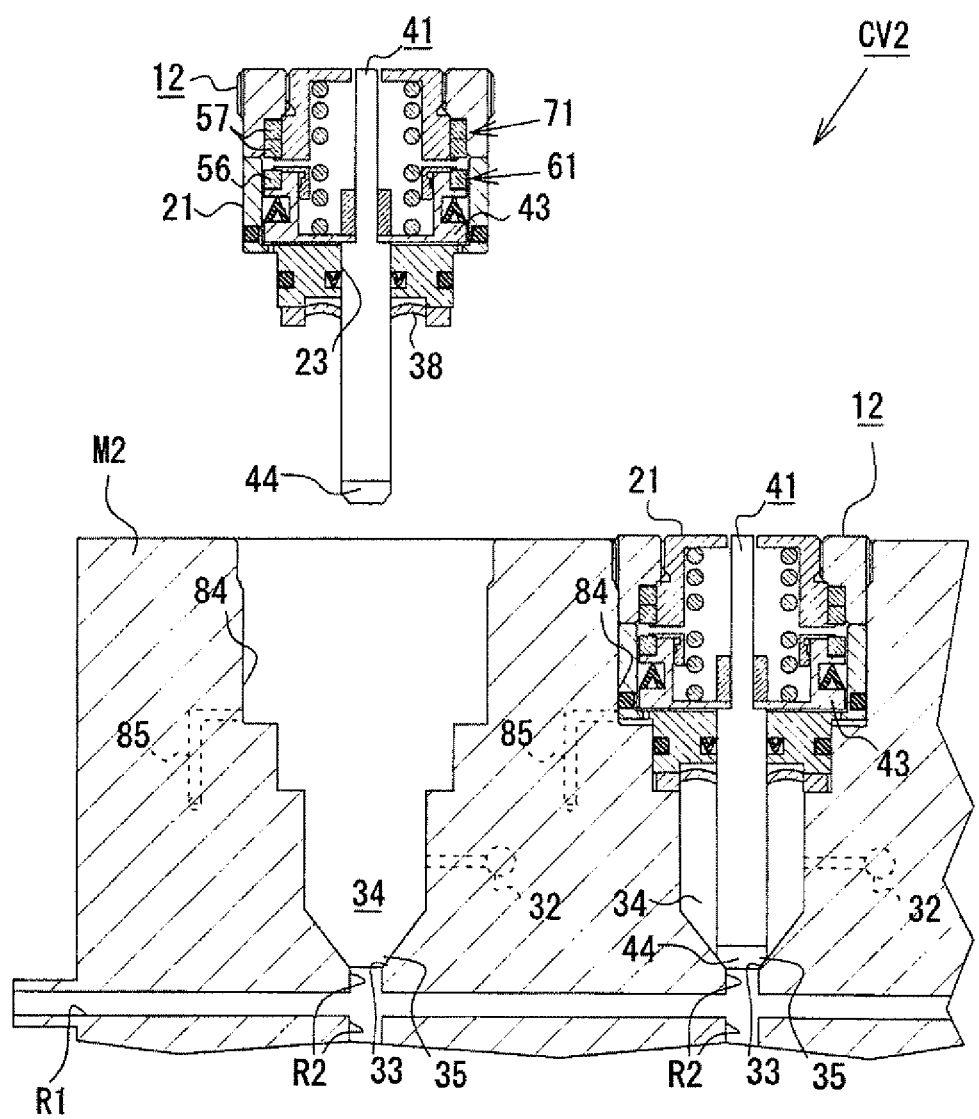
FIG. 5 is the schematic diagram for demonstrating the valve system of the second embodiment configured by using the valve module that embodies the present invention.

Hereinafter, the valve system of the second embodiment that is configured by using the valve module 12 embodying the present invention is described in detail with reference to FIG. 5. The valve module 12 constituting the valve system of the present embodiment is the same as that used in the color-change valve 11A of the first embodiment. Therefore, here, the parts that are different from the first embodiment are mainly described, and of the common parts, only the same reference numbers are given, and the detailed descriptions are omitted.

The manifold block M2 in the present embodiment has the function as a valve housing, and the plurality of the valve-module mounting portions 84 are formed at a plurality of locations thereof. The bottom region of each valve-module mounting portion 84 is the flow path 34 through which coating or the like flows, and the input port 32 and output port 33 are formed in communication with the portion of the flow path 34. The output port 33 located at the center of the bottom of each valve-module-mounting portion 84 is connected to each sub-flow path R2 provided in the manifold block M2, and the valve seat 35 is formed at the connecting point thereof. Also, a plurality of pilot-air-introduction paths 85 is provided on the manifold block M2, and each pilot-air-introduction path 85 is open on the inner surface of each valve-module-mounting portion 84. Then, the color-change device CV2 is configured by mounting the valve module 12 for each color-change valve on each valve-module-mounting portion 84. At this time, the valve module 12 is mounted on each valve-module-mounting portion 84 with the tip-end side of the valve rod 41 facing the bottom, that is, the valve 44 of the valve rod 41 is in contact with the valve seat 35.

Also, in the present embodiment as configured as described above, the valve rod 41 is driven in the vertical direction by supplying and discharging the pilot air, and the valve 44 is brought into contact with, and separated from, the valve seat 35, thus making it possible to control the opening and closing of the valve. In addition, such a valve module 12 is operable with a relatively low pressure of pilot air despite its small size, and it has excellent durability with less performance variations among the products.

Third Embodiment

Figure 6:
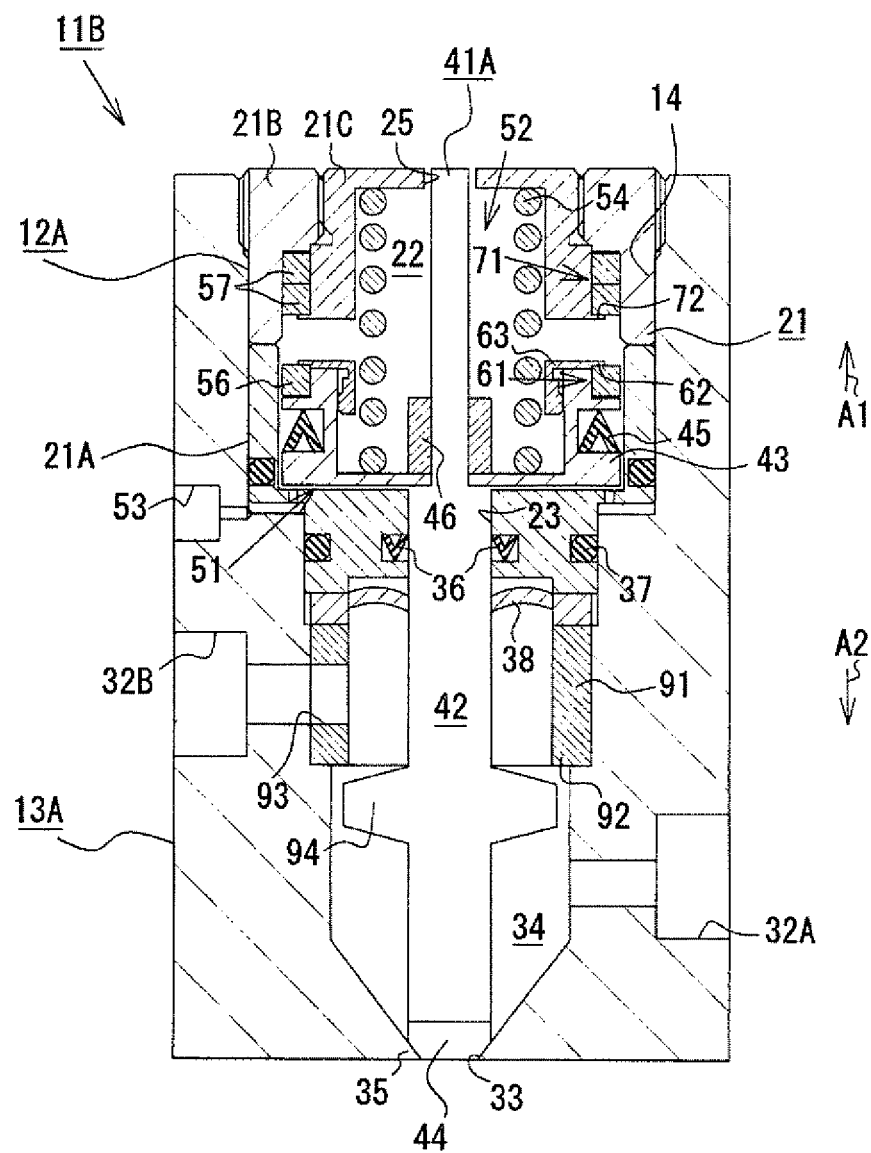
FIG. 6 is the schematic vertical-sectional view showing the valve device of the third embodiment configured by using the valve module that embodies the present invention.
Figure 7:
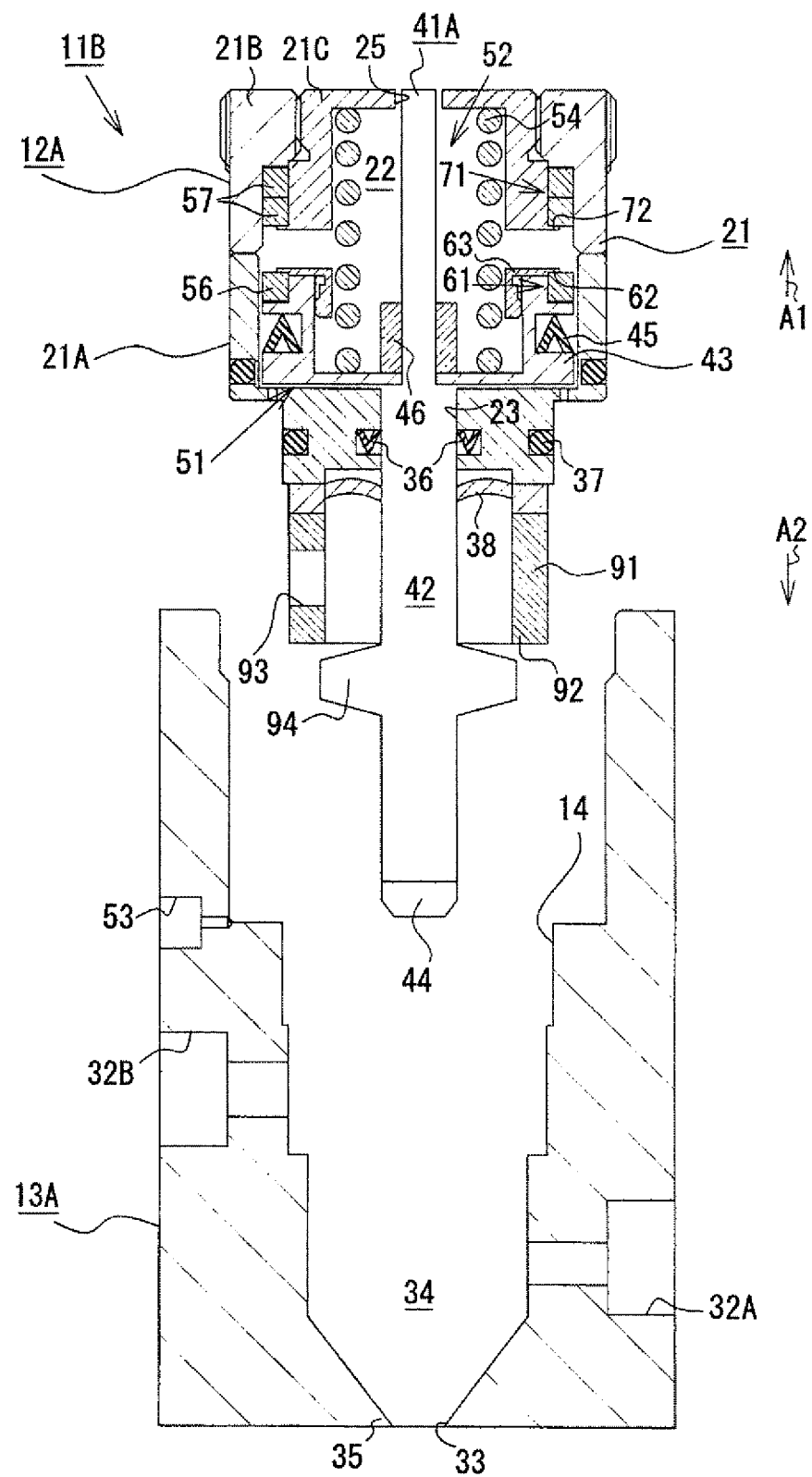
FIG. 7 is the schematic vertical-sectional view of the third embodiment showing a state in which the valve module is taken out from the housing block.
Figure 8A:
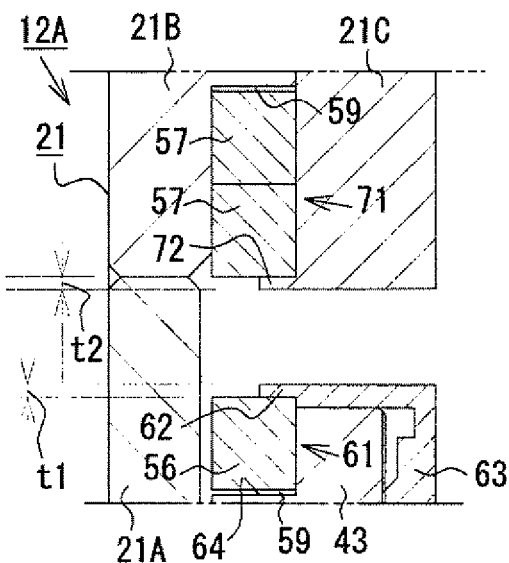
FIG. 8(a) shows the state in which the permanent magnets are most separated from each other.
Figure 8B:
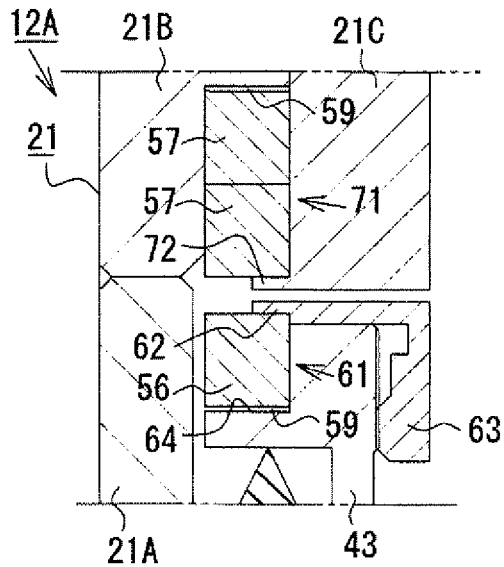
FIG. 8(b) shows the state in which the permanent magnets are closest to each other.

Hereinafter, the colorchange valve 11B of the third embodiment, which embodies the valve device of the present invention, is described in detail with reference to FIGS. 6 to 8. FIG. 6 is a schematic vertical-sectional view showing the color-change valve 11B of the present embodiment configured by using the valve module 12A. FIG. 7 is a schematic vertical-sectional view showing the state in which the valve module 12A is taken out from the housing block 13A. FIG. 8(a) is an enlarged cross-sectional view of the main part showing the state in which the permanent magnets are most separated from each other, and FIG. 8(b) is an enlarged cross-sectional view of the main part showing the state in which the permanent magnets are the closest to each other. Also, in this embodiment, the parts different from the first embodiment are mainly described, and as for the common parts, only the same numeral-reference numbers are given, and the detailed descriptions are omitted.

The color-change valve 11B is composed of the valve module 12A that is the valve-driving part, and a housing block 13A that is the valve-main body. However, it is different in that the color-change valve 11 of the first embodiment is a two-port valve, while the color-change valve 11B of the present embodiment is a three-port valve (3-way valve).

The first input port 32A and the second input port 32B are formed at two locations on the side-surface of the housing block 13A of the present embodiment, respectively. These two input ports 32A and 32B communicate with the flow path 34 together with the output port 33, respectively. The valve seat 35 having a tapered cross section is formed inside the valve-module-mounting portion 14, specifically, inside the opening of the output port 33.

In the case of the valve module 12A of the present embodiment, the sleeve-shaped member 91 is further arranged on the lower end-surface side of the diaphragm seal 38, and the opening on the lower surface side of the sleeve-shaped member 91 is the valve seat 92. That is, the valve module 12A is different from the valve module 12 of the first embodiment in that the valve seats 35 and 92 are provided at two locations. A through-hole 93 that communicates with the second input port 32B is formed on the sleeve-shaped member 91.

As is the case with the valve rod 41 of the first embodiment, the valve rod 41A in the valve module 12A of the present embodiment has a rod 42, a piston 43, a valve 44 and a fixing-nut 46. However, the valve rod 41A further has a valve 94 at a position different from the tip of the valve rod 41A. The valve 94 is integrally formed in the large-diameter portion of the valve rod 41A, so as to project in the radial direction.

The lower-end side (tip side) of the rod 42 projects to the outer region of the piston-housing chamber 22 through the rod-insertion hole 23, and further passes through the central hole of the diaphragm seal 38 and the sleeve-shaped member 91, so as to reach the outer-region side (flow path 34) of the piston-housing chamber 22. The valve 44, located below, as shown in FIG. 6, can make contact with and separate from the valve seat 35 on the housing block 13A with the vertical movement of the valve rod 41A. Incidentally, FIG. 6 shows the state in which the valve 44 is in contact with the valve seat 35. Further, the valve 94, located above, as shown in FIG. 6, can make contact with and separate from the valve seat 92 on the valve module 12A with the vertical movement of the valve rod 41A. Incidentally, FIG. 6 shows the state in which the valve 94 is separated from the valve seat 92.

Here, the magnetic attraction force is of minimum value at the time when the pilot air in FIG. 6 is not supplied, since the first permanent magnet 56 and the second permanent magnet 57 are most separated from each other (e.g. approximately 1.0 mm to 5.0 mm separated), as shown in FIG. 8(a). Similarly, the first flange 62 and the second flange 72 are also separated from each other by approximately 0.5 mm to 4.0 mm. At this time, since the magnetic-attraction force is set to be less than the biasing force of the coil spring 54, the piston 43 moves in the second direction A2. As a result, the valve rod 41A moves downward, and the valve 44 makes contact with the valve seat 35 on the housing block 13A side, while the valve 94 separates from the valve seat 92 on the valve module 12A side. At this time, the output port 33 is closed in the state of non-communication with the flow path 34, and the two input ports 32A and 32B are in the state of being communicated with each other via the flow path 34.

When the pilot air is supplied, the pressing force of the pilot air and the magnetic-attraction force act simultaneously, so that the piston 43 moves in the first direction A1 against the biasing force of the coil spring 54. Then, the valve rod 41A moves upward, and the valve 44 separates from the valve seat 35 on the housing block 13A side, while the valve 94 makes contact with the valve seat 92 on the valve module 12A side, whereby the piston 43 is in the suspended state. At this time, the first flange 62 and the second flange 72 do not make contact with each other and are in the state of being closest to each other at a distance of approximately 0.5 mm to 2.0 mm. At this time, the flow path 34 between the two input ports 32A and 32B is closed in the non-communication state, and the output port 33 is opened to communicate with the input port 32A via the flow path 34.

Also, in the colorchange valve 11B of the present embodiment, configured as described above, the valve rod 41A is driven in the vertical direction by supplying and discharging pilot air, and the two valves 44 and 94 are brought into contact with and separated from the valve seats 35 and 94, respectively, thus making it possible to control the opening and closing of the valve. In addition, such a color-change valve 11B is operable with a relatively low pressure of pilot air despite its small size and has excellent durability with less performance variations among the products. Particularly, in the case of the present embodiment, the color-change valve 11B, which is a three-way valve, is configured in an arrangement relationship such that the first flange 62 and the second flange 72 do not make contact with each other when the two permanent magnets 56 and 57 are closest to each other. That is, since the piston 43 stops when the valve 94 makes contact with the valve seat 92 on the valve module 12A side, all of the upward-driving force with respect to the piston 43 is added to the valve 94 and valve seat 92, thus making it possible to provide a high-sealing property between the valve portion 94 and valve seat 92.

The embodiment of the present invention may be modified as follows.

Figure 9:
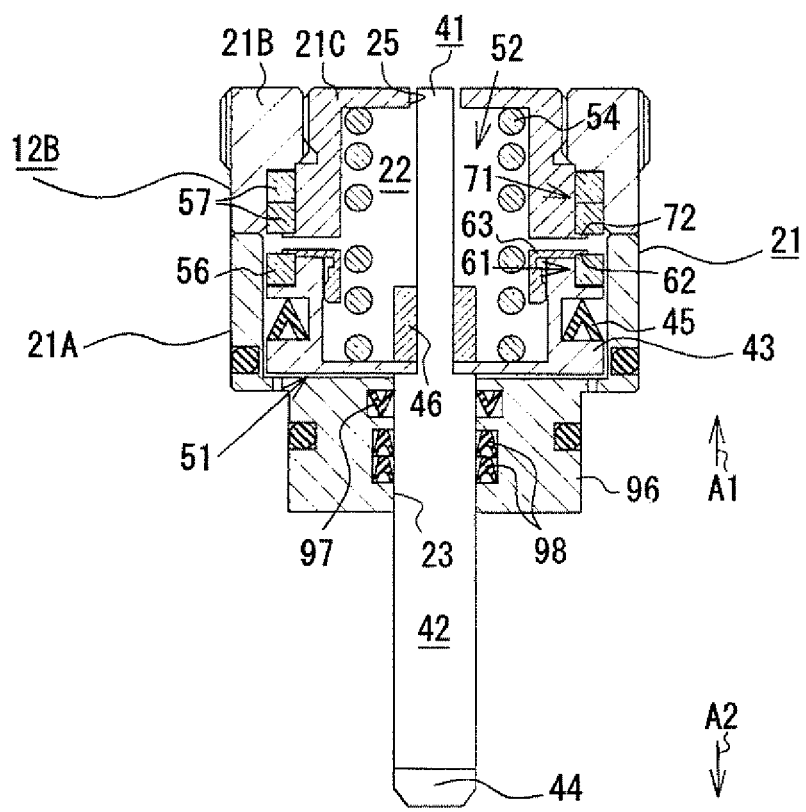
FIG. 9 is the schematic vertical cross-sectional view showing the valve module of another embodiment.

According to the first embodiment or the like, the diaphragm seal 38 is used to prevent coating or a cleaning agent or the like from leaking to the piston-housing chamber 22 through the rod-insertion hole 23, but it is not limited to this. For example, in the case of the valve module 12B of the color-change valve of another embodiment, as shown in FIG. 9, the sleeve-shaped shaft seal 96 is provided instead of the diaphragm seal 38, and the plurality of types of seal members 97, 98 are provided on the inner-peripheral surface thereof, thus securing sealability.

Figure 10:
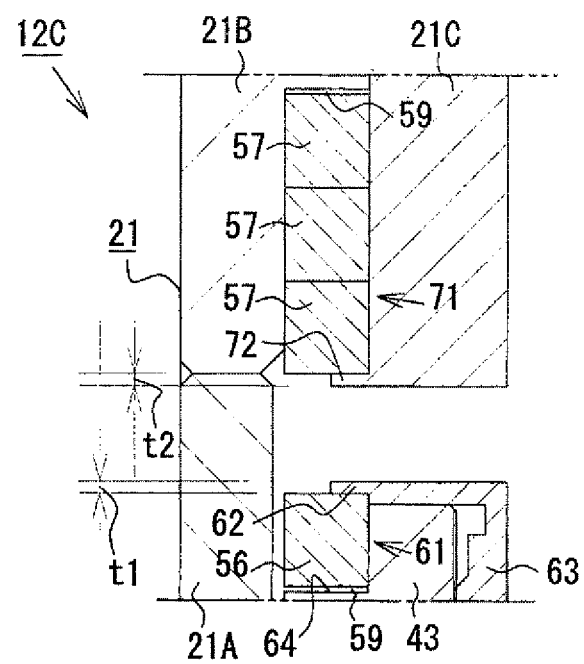
FIG. 10 is the enlarged cross-sectional view of the main part showing the valve module of another embodiment.

According to the first embodiment or the like, one first-permanent magnet 56 and two second-permanent magnets 57 are used, but it is not limited to this. For example, in the case of the valve module 12C of the color-change valve of another embodiment, as shown in FIG. 10, the number of second-permanent magnets 57 may be further increased to three, in which case a greater magnetic-attraction force can be obtained. Also, the number of the second-permanent magnets 57 may be four or more. The number of first-permanent magnets 56 is not limited to one, and it is of course allowable to have two or more. In FIG. 10, three second-permanent magnets 57 of the same diameter and of the same thickness are used, but the thicknesses of the second-permanent magnets 57 may be different. For example, it is possible to use one second-permanent magnet 57 of a predetermined thickness and another second-permanent magnet 57 of a thickness twice as much as the predetermined thickness. Of course, when a plurality of first-permanent magnets 56 are used, the thickness of each may be the same or different. Further, according to the first embodiment or the like, the thickness of the first-permanent magnet 56 and of the second-permanent magnet 57 is the same, but it may be different. Furthermore, the diameter of the first-permanent magnet 56 and the diameter of the second permanent magnet 57 is the same, but it may be different.

According to the first embodiment or the like, the coil spring 54 is used as the biasing means. However, it is possible to use a spring of a shape other than that of the coil spring 54, or a biasing means other than the spring. Further, it is possible to use the pilot air to drive the piston portion 43 in the second direction A2 in the same manner as in the case in which the piston 43 is driven in the first direction A1.

According to the first embodiment or the like, the first permanent magnet 56 and the second permanent magnet 57 are both annular in shape, but such a shape thereof is not limited to the annular shape. It may be of any shape.

According to the first embodiment or the like, it is configured that the biasing force of the biasing means acts in the direction of closing the valve, and the pressure of the pilot air and the attractive force of the permanent magnets act in the direction of opening the valve. However, it is not limited to this. In other words, it may be configured that the biasing force of the biasing means acts in the direction of opening the valve, and the pressure of the pilot air and the attractive force of the permanent magnets act in the direction of closing the valve.

According to the first embodiment or the like, the first permanent magnet 56 is provided at the outer-peripheral position of the piston 43, and the second permanent magnet 57 is provided at the position facing the first-permanent magnet 56 on the piston housing 21 side. However, it is possible to add the first and second permanent magnets 56 and 57 to further different locations, respectively. For example, the first-permanent magnet 56 may be added near the center of the valve rod 41, and the second-permanent magnet 57 may be added at the position facing the added first-permanent magnet 56 on the piston housing 21 side. With such a configuration, a greater magnetic-attraction force can be obtained.

According to the first embodiment or the like, the coil spring 54 is formed of a material made of a non-magnetic material, but it is not limited to this. For example, it is possible to use a non-magnetic material for all valve components other than the first-permanent magnet 56 and the second-permanent magnet 57.

Figure 11:
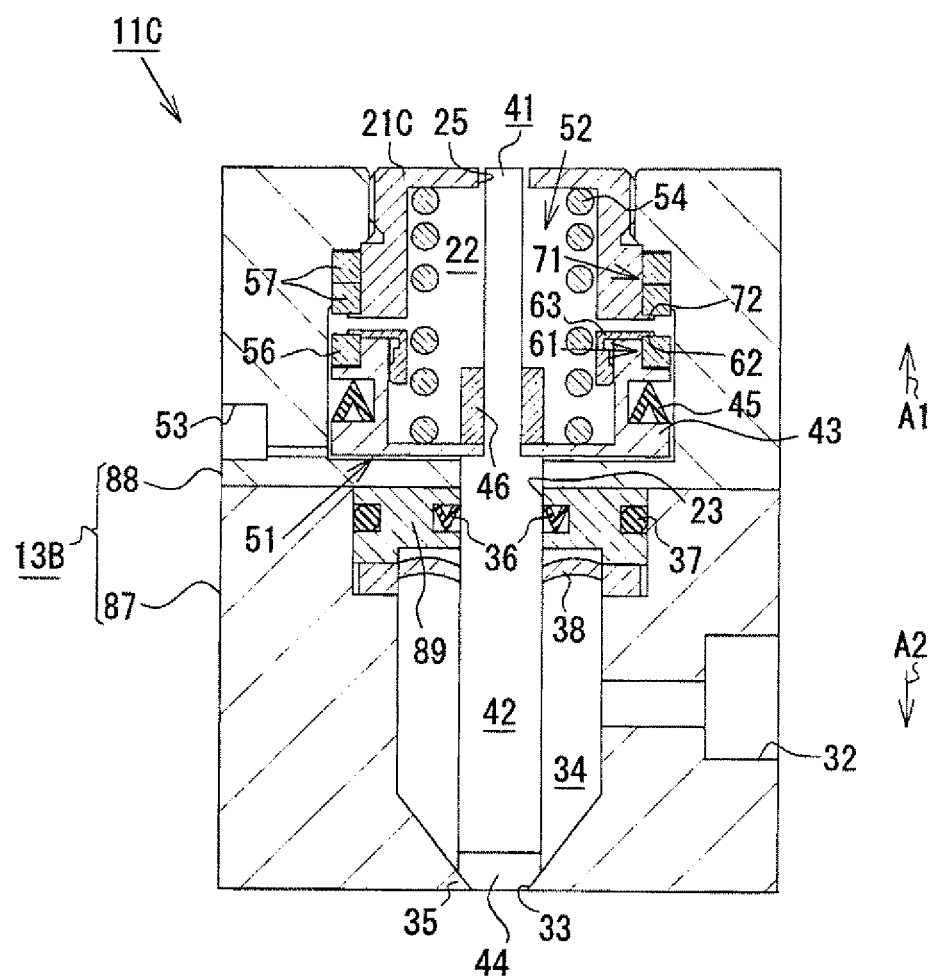
FIG. 11 is the enlarged cross-sectional view of the main part showing the valve device of another embodiment.
Figure 12:
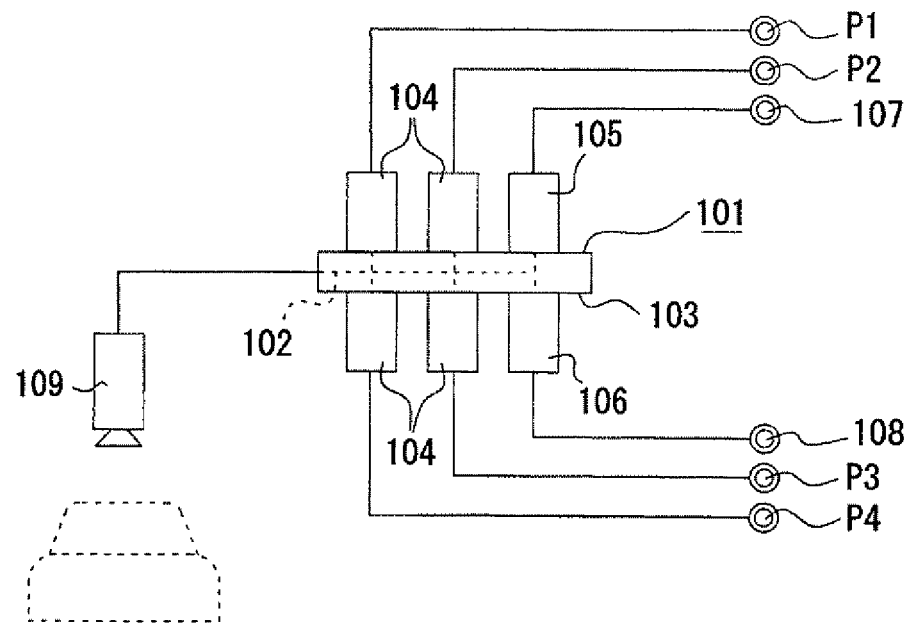
FIG. 12 is the schematic diagram for demonstrating the configuration of the color-change device using the valve device.
Figure 13:
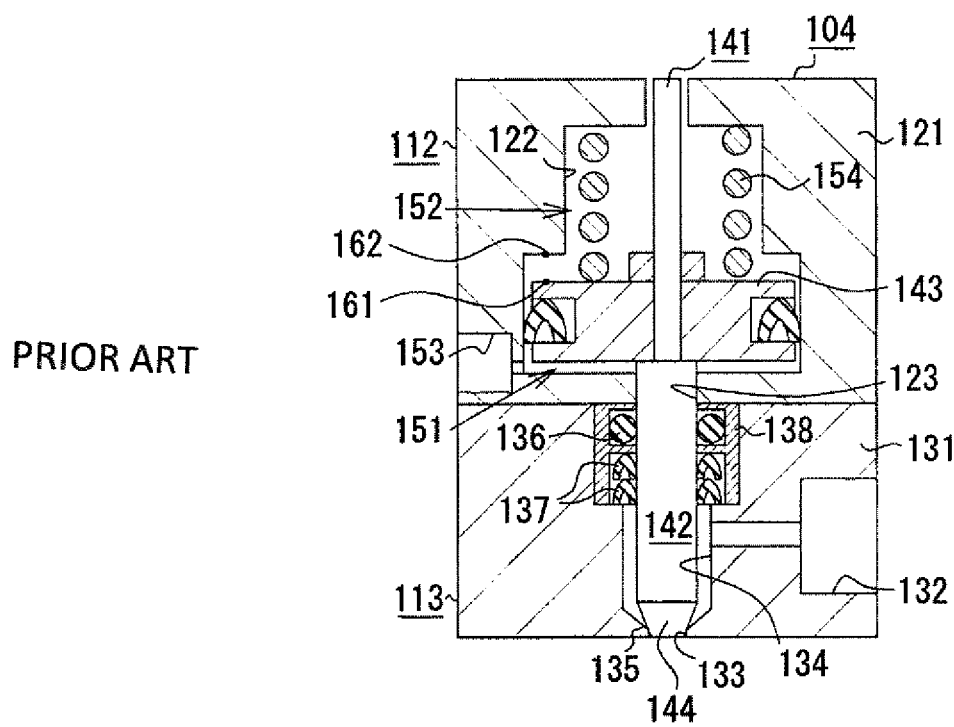
FIG. 13 is the schematic vertical cross-sectional view showing the conventional valve device.

For example, it is further possible that the valve device can also be configured as the valve device 11C as shown in FIG. 11. The parts different from the valve device 11, as shown in FIG. 1, are mainly described, and of the common parts, only the same numeral-reference numbers are given, and the detailed descriptions thereof are omitted. The valve device 11C includes a housing block 13B composed of the member 88 on the valve-drive portion set on the upper side of the drawing, and of the member 87 on the valve-body portion set on the lower side of the drawing. The piston-housing chamber 22 is formed inside the member 88 on the valve-drive portion, and the valve seat 35 is formed inside the member 87 on the valve-body portion. On the other hand, unlike the one in FIG. 1, the valve device 11C does not have a member corresponding to the lower member 21A and upper member 21B. The lid member 21C is screwed, crimped, bonded, or the like to the upper opening of the member 87 on the valve body. As a result, the second-magnet holder 72 is provided on the housing block 13B (i.e. between the member 87 on the valve body and the lid member 21C). Further, a cylindrical-shaft seal 89 having a rod-insertion hole 23 is arranged in the vicinity of the joint interface between the member 88 on the valve-drive portion and the member 87 on the valve-main body. Seal members 36 and 37 are arranged on the shaft seal 89, respectively.

According to the first embodiment or the like, the valve device of the present invention is used as the color-change valve 11 constituting the color-change device CV1 for the coating equipment. However, it is not limited to this, and it is of course possible to use it for other purposes.

Besides the technical ideas of this invention, as described above, other technical ideas to be understood are described hereinafter.

(1) In any one of the first to the 14th aspects of this invention, the biasing force of the biasing means acts in the direction of closing the valve, while the pressure of the pilot air and the magnetic attraction force acts in the direction of opening the valve.

(2) In any one of the first to the 14th aspects of this invention, valve components other than the first permanent magnet and the second permanent magnet are made of a non-magnetic material.

(3) In any one of first to the 14th aspects of this invention, the biasing means is a spring made of a non-magnetic metal.

(4) In any one of the first to the seventh aspects of this invention, the valve module constitutes a three-way valve, and the arrangement relationship of which the two collision-avoidance portions do not collide with each other when the two permanent magnets are closest to each other, is not set between the two permanent magnets, (5) In any one of the first to the seventh aspect of this invention, the valve module constitutes a two-way valve, and the arrangement relationship of which the two collision-avoidance portions collide with each other when the two permanent magnets are closest to each other, thus making the valve rod suspended, is set between the two permanent magnets.

(6) In any one of the eighth to the 14th aspects of this invention, the valve device is a three-way valve, and the arrangement relationship of which the two collision-avoidance portions do not collide with each other when the two permanent magnets are closest to each other, is set between both permanent magnets, (7) In any one of the eighth to 14th aspects of this invention, the valve device is a two-way valve, and the arrangement relationship of which the two collision-avoidance portions collide with each other when the two permanent magnets are closest to each other, thus making the valve rod suspended, is set between both permanent magnets,

11, 11B, 11C: Color-change valve as the valve device
12, 12A, 12B, 12C: valve module
13, 13A, 13B: Housing block
14, 84: Valve-module-attaching portion
21: Piston-housing body
22: Piston-housing chamber
35, 92: Valve seat
41, 41A: Valve rod
43: Piston
44, 94: Valve
51: First chamber
52: Second chamber
53: Pilot port
56: First permanent magnet
57: Second permanent magnet
61: First-magnet holder
62: First flange as the first-collision-avoidance portion
71: Second-magnet holder
72: Second flange as the second-collision-avoidance portion
A1: First direction
A2: Second direction
M1, M2: Manifold block
T3: Total thickness

The invention claimed is:

1. A valve-module comprising:
a piston-housing body having a piston-housing chamber,
a valve-rod of which a part thereof is inserted into the piston housing body, and
a piston is provided in the region located inside the piston-housing chamber, and a valve is formed in the region located outside the piston-housing chamber,
wherein, the valve-rod is driven in a first direction by [Ethel] air pressure of pilot-air acting upon the piston, and is driven in a second direction opposite the first direction by a biasing-force of a spring as a biasing-means; then the valve makes contact with and separates from a valve-seat by supplying and discharging the pilot-air, thus controlling the opening and closing of the valve, the valve-body comprising:

a first-magnet holder provided at an outer periphery of the piston;

a second-magnet holder provided at a position facing the first-magnet holder on a piston-housing body side;

a first-permanent magnet held by the first-magnet holder in a state in which an end-face thereof makes contact with a thin-walled first-collision-avoidance portion formed at a position closest to the second-magnet holder; and a second-permanent magnet held by the second-magnet holder in a state in which the end-face thereof makes contact with a thin-walled second-collision-avoidance portion formed at a position closest to the first-collision-avoidance portion of the first-magnet holder;

wherein, a magnetic-attraction force acts between both first- and second-permanent magnets, and drives the piston in the first direction, and increases with [Ethel] a mutual approach of both first- and second-permanent magnets; in addition, an arrangement-relationship is set between both first- and second-permanent magnets such that the end-faces thereof do not directly collide with each other, even when they are closest to each other, and further wherein each of the first-permanent magnet and the second-permanent magnet is an annular-permanent magnet of the same diameter and is magnetized in a thickness direction and the first-permanent magnet or the second-permanent magnet is arranged in multiple stages in the thickness direction by using a plurality of magnets.

2. The valve-module according to claim 1, characterized in that a dimension of a housing space of the first-magnet holder, in an axial direction of the valve-rod, is greater than a dimension in the axial direction of the first-permanent magnet, and that a dimension of a housing space of the second magnet holder, in the axial direction of the valve-rod, is greater than a dimension in the axial direction of the second-permanent magnet.

3. The valve-module according to claim 1, characterized in that the first-collision-avoidance portion makes contact with the end-face of the first-permanent magnet in a state in which at least a part of the end-face of the first-permanent magnet is exposed to an outside of the first-magnet holder, and that the second-collision-avoidance portion makes contact with the end-face of the second-permanent magnet in a state in which at least a part of the end-face of the second-permanent magnet is exposed to an outside of the second-magnet holder.

4. The valve-module according to claim 1, characterized in that a total thickness of the first-collision-avoidance portion and the second collision-avoidance portion is 1.0 mm or less.

5. The valve-module according to claim 1, characterized in that a number of second-permanent magnets is greater than a number of first-permanent magnets.

6. A valve-device comprising:

a housing-block having a piston-housing chamber and a valve-seat inside, a valve-rod of which a part thereof is inserted into the piston-housing body, and a piston is provided in the region located inside the piston-housing chamber, and a valve is formed in the region located outside the piston-housing chamber, wherein, the valve-rod is driven in a first direction by air pressure of pilot-air acting upon the piston, and is driven in a second direction opposite the first direction by a biasing-force of a spring as a biasing-means; then the valve makes contact with and separates from a valve-seat by supplying and discharging the pilot-air, between the opening and closing of the valve, characterized the valve-body comprising:

a first-magnet holder provided at an outer periphery of the piston;

a second-magnet holder provided at a position facing the first-magnet holder on a housing-block side;

a first-permanent magnet held by the first-magnet holder in a state in which an end-face thereof makes contact with a thin-walled first-collision-avoidance portion formed at a position closest to the second-magnet holder; and a second-permanent magnet held by the second-magnet holder in a state in which an end-face thereof makes contact with a thin-walled second-collision-avoidance portion formed at a position closest to the first-collision-avoidance portion of the first-magnet holder;

wherein, a magnetic-attraction force acts between both first- and second-permanent magnets, and drives the piston in the first direction, and increases with a mutual approach of both first- and second-permanent magnets; in addition, an arrangement-relationship is set between both first- and second-permanent magnets such that the end-faces thereof do not directly collide with each other, even when they are closest to each other, and wherein each of the first-permanent magnet and the second-permanent magnet is an annular-permanent magnet of the same-diameter and is magnetized in a thickness direction and the first-permanent magnet or the second-permanent magnet is arranged in multiple stages in the thickness direction by using a plurality of magnets.

7. The valve-device according to claim 6, characterized in that a dimension of a housing space of the first-magnet holder, in an axial direction of the valve-rod, is greater than a dimension in the axial direction of the first-permanent magnet, and that a dimension of a housing space of the second magnet holder, in the axial direction of the valve-rod, is greater than a dimension in the axial direction of the second-permanent magnet.

8. The valve-device according to claim 6, characterized in that the first collision-avoidance portion makes contact with the end-face of the first-permanent magnet in a state in which at least a part of the end-face of the first-permanent magnet is exposed to an outside of the first-magnet holder, and that the second collision-avoidance portion makes contact with the end-face of the second-permanent magnet in a state in which at least a part of the end-face of the second-permanent magnet is exposed to an outside of the second-magnet holder.

9. The valve-device according to claim 6, characterized in that a total thickness of the first collision-avoidance portion and the second collision-avoidance portion is 1.0 mm or less.

10. The valve-device according to claim 6, characterized in that a number of second-permanent magnets is greater than a number of first-permanent magnets.

11. The valve-device comprising the valve-module according to claim 1, and a valve-housing block having a valve module-mounting portion in which the valve-seat is formed therein, characterized in that the valve-module is mounted on the valve-housing block in a state in which the valve-body abuts the valve-module-mounting portion.

12. The valve-system comprising at least one valve-module according to claim 1, and a manifold-block having at least one valve-module-mounting portion in which the valve-seat is formed therein, characterized in that the valve-module is mounted in the manifold-block in a state in which the valve-body abuts the valve-module-mounting portion.

* * * * *